April 2, 1963  B. E. BALTHAZOR  3,083,499

SPRING SUSPENSION FOR TOY VEHICLE

Filed Feb. 6, 1961

*INVENTOR.*
B. E. BALTHAZOR

BY

ATTORNEY 3,083,499
SPRING SUSPENSION FOR TOY VEHICLE
Bernard E. Balthazor, Moline, Ill., assignor, by mesne assignments, to Buddy L Corporation, East Moline, Ill., a corporation of Delaware
Filed Feb. 6, 1961, Ser. No. 87,376
3 Claims. (Cl. 46—221)

This invention relates to a toy vehicle and more particularly to improved suspension means for at least one of the wheeled axles of such vehicle.

It is commonplace that a large majority of the toy vehicles currently on the market are scale models, or nearly so, of existing full-size vehicles, but in the majority of cases there is simulation rather than duplication of the full-size features. This is due primarily to such things as cost and design factors, for obviously every detail of full-size vehicles cannot be duplicated in a toy. Therefore, the ingenuity of the designer is often taxed to obtain the function of the full-size feature and at the same time to embody at least some of the appearance thereof.

According to the present invention, one of the features sought to be obtained, and in fact actually obtained in commercial embodiments, is the provision of improved suspension means between the vehicle and at least one of its wheeled axles whereby this axle may have vertical, resiliently opposed movement to simulate the spring means of similar wheeled axles in full-sized vehicles. It is a principal object of the invention to provide the spring suspension means in a simple and inexpensive manner, embodying as subsidiary objects the mounting of the axle in the vehicle frame in such manner that it has limited vertical movement relative to the vehicle body, the interposition of spring means between the vehicle body and the axle normally holding the axle downwardly (or the vehicle body upwardly) within the limits of the lost-motion means, plus the provision of the spring means in the form of a simple one-piece leaf spring having removable connections with the body and with transversely spaced apart portions of the axle. A significant feature of the invention is the provision on the leaf spring of means providing a bearing and thus improving the engagement between the leaf spring and the axle. A still further feature resides in the provision of means whereby the spring may be readily installed in and just as readily removed from the vehicle and axle relationship without the use of tools.

The foregoing and other important objects and desirable features inherent in and encompassed by the invention will become apparent as a preferred embodiment thereof is disclosed, by way of example, in the ensuing description and accompanying sheet of drawings, the figures of which are described below.

Figure 1:
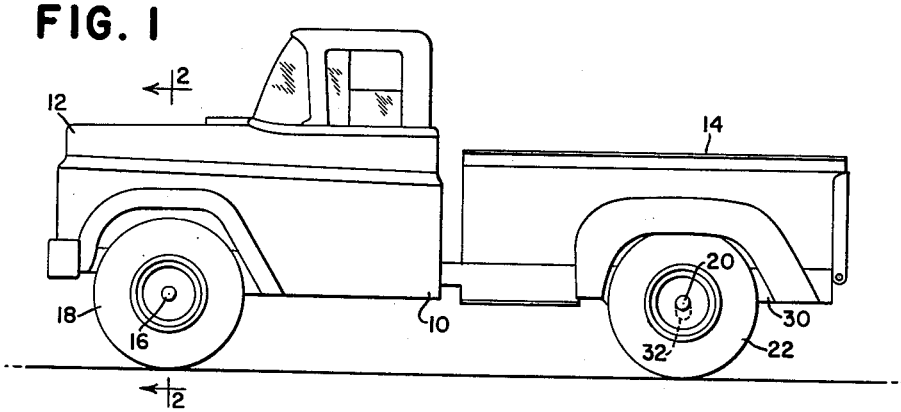
FIGURE 1 is an elevational view of a representative toy vehicle embodying the improved spring suspension means.

The vehicle chosen for purposes of illustration is a pick-up truck having a longitudinal or fore-and-aft body 10 having a forward combined cab-fender-hood structure 12 and a rear cargo-carrying box 14. The forward portion of the body, as represented by the structure 12, is carried on a transverse front axle 16 and a pair of front wheels 18 mounted on this axle. The rear portion of the body is carried on a transverse rear axle 20 and this axle is provided with a pair of rear wheels 22, only one of which is shown.

The under portion of the structure 12 has what may be regarded as a floor or bottom portion 24, the structure being preferably formed of sheet metal, although this is not a limitation. Integral with the floor or bottom portion 24 and respectively at transversely spaced apart opposite sides thereof are depending portions 26, each of which is provided with a generally upright slot 28 through which the axle 16 loosely passes. Each slot 28 is tolerably larger than the diameter of the cylindrical axle 16 so as to confine the axle against undesirable fore-and-aft shifting but each slot is of course vertically longer than the diameter of the axle so as to enable limited vertical movement of the axle relative to the body. The body is extended at its rear, beneath the cargo box 14, as a pair of transversely spaced apart fore-and-aft side sills 30, each of which is slotted at 32 to accommodate the rear axle 20, for purposes to presently appear.

The design of the vehicle and the related axles 16 and 20 is such that under normal conditions the axle 16 is at the bottoms of the slots 28 and the rear axle 20 is at the tops of the rear slots 32. The downward position of the axle 16 is maintained by spring means, here in the form of a one-piece preferably metallic leaf spring designated in its entirety by the numeral 34. This spring is in the form of what may be regarded as an inverted U and has a central or bight portion 36 and, when in place, has a pair of laterally outwardly and downwardly diverging legs 38, each of which has a terminal part 40 engaging the axle, it being clear that the parts 40 engage the axle at transversely spaced apart portions thereof and relatively proximate to opposite ends of the axle as represented by those portions of the axle which respectively carry the wheels 18. In the preferred embodiment, the terminal parts 40 are just laterally inwardly of the depending portions 26 which have the slots 28.

Figure 3:
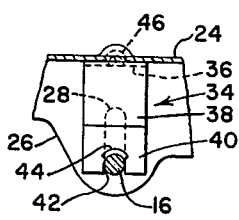
FIGURE 3 is a section as seen along the line 3—3 of FIGURE 2.

The manner in which each terminal part 40 engages the axle 16 is of significance, since it contributes to the several features heretofore outlined. In the preferred embodiment illustrated, each terminal part 40 has therein a downwardly opening notch 42 which fits the axle 16 with sufficient clearance to enable rotation of the axle, which is important in those cases in which the wheels 18 are fixed to the axle 16 so that the entire unit rotates at once. However, this again is not a limitation. To further improve the relationship between each terminal part 40 and its axle 16, each terminal part has thereon a laterally outwardly projecting tab 44 which, as best shown in FIGURE 3, is of arcuate section to conform to a portion of the cylindrical surface of the axle 16. In the formation of the spring 34, the tabs 44 may be those portions struck out of the terminal parts 40 to provide the notches 42. Thus, there is provided improved bearing relationships between the axle and the spring.

Figure 2:
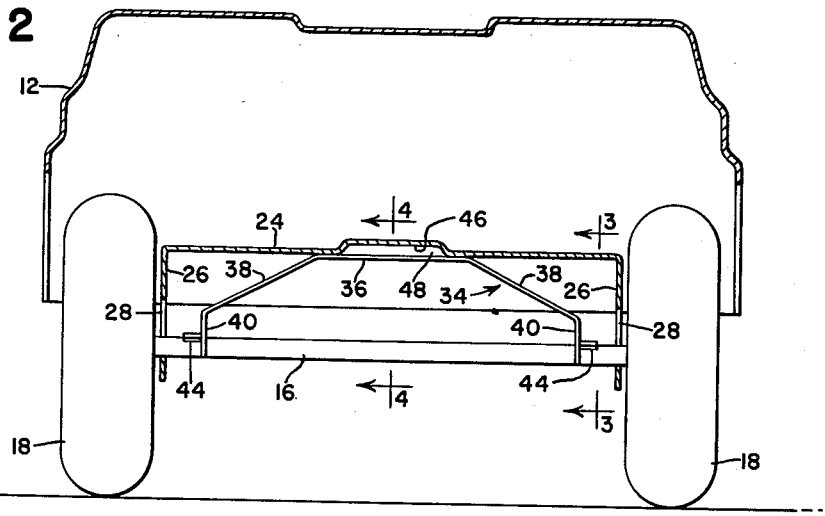
FIGURE 2 is an enlarged transverse section as seen along the line 2—2 of FIGURE 1.
Figure 4:
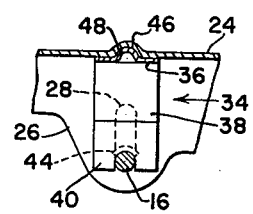
FIGURE 4 is a section as seen along the line 4—4 of FIGURE 2.

As seen in FIGURES 2, 3 and 4, the spring 34 in its normal position has its bight 36 engaging under the floor or bottom portion 24 of the vehicle and its terminal parts 40 engaging the axle 16 at transversely spaced apart portions thereof, the spring of course being biased to hold the axle 16 normally downwardly against the bottoms of the slots 28. Direct downward pressure on the front portion of the vehicle will of course cause the spring 34 to yield so that the axle 16 may move upwardly within the limits established by the upper ends of the slots 28. Pressure at either side of the longitudinal center line of the vehicle will of course distort one side of the spring and will therefore allow the axle to oscillate generally about its opposite wheel, thus simulating the conventional "knee action" of full-size vehicles. In such instances, the slots 32 at the rear of the vehicle accommodate this movement without causing the rear wheels 22 to be lifted from the ground. The same relative movement may be seen to occur in the event that one or both of the wheels 18 encounters a deviation from the normal level surface over which the vehicle is being operated. For example, if the left front wheel strikes a bump, the spring 38 will yield at that side, and vice versa.

In addition to the notches 42 in the terminal parts 40 of the spring legs 38, which contribute to the ready removal and installation of the spring 34, the center portion 36 of the spring has thereon an element which cooperates with a cooperating element on the bottom portion 24. In the present case, the element in the bottom portion 24 is a recess 46 and the cooperating element on the spring center portion 36 is what may be regarded as a lug or projection 48. The two elements are so shaped that when the spring 34 is in its normal position the element or lug 48 nests within the recess 46 and these two elements are so proportioned as to confine the spring against both fore-and-aft and transverse relative displacement. This, together with the notches 42, normally keeps the spring in place, particularly since the spring is biased to expand vertically between the body and the axle 16. In a preferred embodiment, the recess 46 may be formed in the bottom or fore portion 24 simply by pressing it therein. Since the spring 34 is formed of strip material, the projection 48 may be similarly formed.

Figure 5:
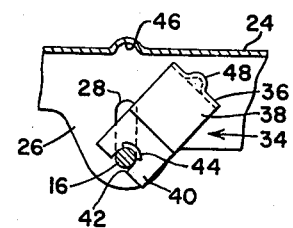
FIGURE 5 is a section, similar to FIGURE 3 but illustrating the manner in which the spring means may be installed and removed.
Figure 6:
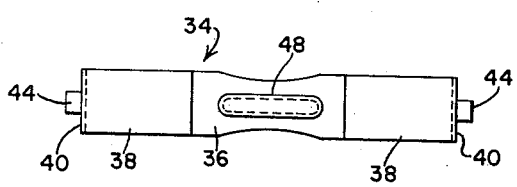
FIGURE 6 is a plan of the spring by itself.

FIGURE 5 illustrates the manner in which the removable cooperation between the several components enables removal and installation of the spring 34. For example, FIGURE 5 may be regarded as representative of a condition preliminary to installing the spring 34, which is accomplished by first engaging the notched terminal parts 40 with the axle 16 and then rotating the spring 34 bodily about the axle, which in FIGURE 5 would be in a counterclockwise direction. Since the spring is capable of being forcibly vertically compressed, it will be seen that the lug 48 is readily receivable in the recess 46. The bias in the spring and the cooperation between the separable elements 46—48 and 42—16 is such that the spring normally is retained in place against inadvertent or accidental displacement.

It will be seen from the foregoing that the several objects and features of the invention, as initially outlined, are readily and desirably accomplished. Features and advantages other than those enumerated will readily occur to those versed in the art, as will many modifications and alterations in the preferred embodiment disclosed, all of which may be achieved without departure from the spirit and scope of the invention.

What is claimed is:

1. A toy vehicle, comprising: a longitudinal body having a transverse bottom and a pair of transversely spaced apart portions depending from said bottom, each of said portions having a substantially upright slot therein and said slots being transversely alined; a transverse axle extending through and confined by said slots and vertically movable within the limits of said slots; wheel means on the opposite ends of the axle; spring means interposed between the bottom and the axle and biased to urge the axle downwardly to the bottoms of the slots and yieldable to allow the axle to move upwardly relative to the body, said spring means comprising a transverse leaf spring of generally inverted U shape including a central bight engaging the bottom of the body and a pair of depending legs respectively having terminal end parts engaging the axle from above, said parts being shaped complementarily to the axle to normally retain engagement therewith because of the bias in the spring and said parts being separable from the axle in a direction radially of said axle when the biasing force of the spring is removed; and means including a downwardly facing first element on the bottom of the body and a second upwardly facing cooperative element on the bight of the spring normally vertically registering with and engaging the first element under action of the spring bias for holding the spring against longitudinal displacement relative to the body about the axle and terminal parts as a pivot, and said second element being downwardly disengageable from said first element upon forcible compression of the spring away from the bottom of the body for enabling swinging of the spring deliberately about said axle as a pivot so as to condition the terminal parts for radial disengagement from said axle.

2. The invention defined in claim 1, in which: said first element is a recess in the bottom of the body and the second element is an upward projection received normally in said recess.

3. The invention defined in claim 1, in which: the terminal parts of the spring legs respectively have downwardly opening notches enabling said radial separation thereof from the axle, and upper portions of said parts bordering the notches have tabs affording relatively wide bearing areas in engagement with the axle.

References Cited in the file of this patent

UNITED STATES PATENTS 2,908,997  Handler _____ Oct. 20, 1959